United States Patent
Bakhle et al.

(10) Patent No.: US 6,778,667 B1
(45) Date of Patent: Aug. 17, 2004

(54) METHOD AND APPARATUS FOR INTEGRATED CIPHERING AND HASHING

(75) Inventors: Ashutosh Bakhle, Chandler, AZ (US); Derek L. Davis, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/475,549

(22) Filed: Dec. 30, 1999

Related U.S. Application Data

(63) Continuation of application No. 08/779,567, filed on Jan. 7, 1997, now Pat. No. 6,021,201.

(51) Int. Cl.[7] .................................................. H04L 9/06
(52) U.S. Cl. .............................. 380/37; 380/29; 380/42; 713/181
(58) Field of Search ....................... 380/258, 37, 42–43, 380/29; 713/181, 180, 161

(56) References Cited

U.S. PATENT DOCUMENTS

| | | | |
|---|---|---|---|
| 5,473,692 A | 12/1995 | Davis | 380/25 |
| 5,539,828 A | 7/1996 | Davis | 380/50 |
| 5,633,932 A | 5/1997 | Davis et al. | 380/25 |
| 5,757,919 A * | 5/1998 | Herbert et al. | 713/187 |
| 5,796,840 A * | 8/1998 | Davis | 705/51 |
| 5,805,712 A * | 9/1998 | Davis | 713/173 |
| 6,021,201 A * | 2/2000 | Bakhle et al. | 713/189 |
| 6,055,316 A * | 4/2000 | Perlman et al. | 380/262 |

* cited by examiner

*Primary Examiner*—Gilberto Barrón
*Assistant Examiner*—Grigory Gurshman
(74) *Attorney, Agent, or Firm*—Blakely, Sokoloff, Taylor & Zafman LLP

(57) ABSTRACT

A cryptography unit having a cipher unit and a hash unit coupled in parallel for simultaneous ciphering and hashing. The cipher unit implements a cipher algorithm that operates on a data block having a first predetermined size M. The hash unit implements a hash algorithm on a data block having a second predetermined size N. Buffers of a size Q, where Q is an integer multiple of M and N, are employed to receive the input data into the present invention. A security unit that ensures that the cipher unit and the hash unit operate on the same data block of size Q is also provided.

23 Claims, 7 Drawing Sheets

METHOD AND APPARATUS FOR INTEGRATED CIPHERING AND HASHING

CROSS-REFERENCES TO RELATED APPLICATIONS

This application is a continuation of U.S. patent application Ser. No. 08/779,567 filed Jan. 7, 1997, now Pat. No. 6,021,201.

BACKGROUND OF THE INVENTION

1. Field of the Invention

The present invention relates generally to the area of data security and in particular relates to a method and apparatus for integrated ciphering and hashing.

2. Description of the Related Art

Cryptographic applications are frequently employed to insure the secure transmission of messages. Cryptographic applications encrypt the message (also referred to herein as plaintext) on the transmission side and decrypt or decode the encrypted message (also referred to herein as ciphering) on the receiving side. This encryption and decryption of messages is commonly known in the art as the ciphering.

In recent years, a number of cryptographic applications also include a feature that allows a user to append a digital signature to a particular message. This digital signature is employed to authenticate the source of a message. This process of signing or authentication is commonly known in the art as signature processing. Both ciphering and signature processing are important components in insuring the secure transmission of messages.

One of the key elements of signature generation and processing is computing a hash value corresponding to a message (e.g., plaintext). In the prior art, the ciphering and hashing occurred in series. For example, a cipher unit processed a message first. Thereafter, the message is passed to a hash unit to perform the hash computation on the message.

The primary disadvantage of this serial implementation of the cipher unit and hash unit is that hash computation cannot begin until the cipher unit completed the encryption or decryption. In other words, the serial implementation suffered in terms of performance. In addition, a two pass system suffers from security issues since the message can be tampered with between the two passes.

First, ciphering algorithms and hash algorithms typically operate on data having different block sizes. For example, whereas a ciphering algorithm would operate on data having a first size (e.g., 64 bits in DES) a hash algorithm may operate on data having a second block size (e.g., 512 bits in MD5 and SHA).

Second, the ciphering algorithms and hash algorithms typically have a different number of processing steps. For example, the DES encryption algorithm, which is a National Bureau of Standard's protocol, specified by Data Encryption Standard, Federal Information Processing Publication 46 includes 16 steps, while the MD5 (R. L. Rivest, "The MD5 Message Digest Algorithm," Request for Comment 1321, April 1992) hashing algorithm includes 64 steps. In a hardware implementation, each step typically is performed in one clock cycle. It is understood by those skilled in the art that the actual number of cycles for each step is variable and depends on the process technology employed to implement the cipher and hash operations. It is appreciated that the time for the cipher unit to complete its processing is different from the time for the hash unit to complete its processing.

Accordingly, a method and apparatus for integrated ciphering and hashing that overcomes the disadvantages noted previously is needed.

SUMMARY OF THE INVENTION

A method and apparatus for integrating the ciphering and hashing of a message is disclosed. The present invention includes a cipher unit for providing encryption and decryption services and a hash unit for generating a hash value corresponding to the message. The cipher unit operates on a block of data having a first predetermined size M, and the hash unit operates on a data block having a second predetermined size N. A storage unit is provided by the present invention having a size Q which is an integer multiple of M and N. Moreover, security enhancement unit of the present invention ensures that the cipher unit and the hash unit operate on the same block of data of size Q. The security enhancement unit ensures that the cipher unit and hash unit do not accept a next block of data (i.e., new data) until both units have completed processing the current block of data.

BRIEF DESCRIPTION OF THE DRAWINGS

The features and advantages of the method and apparatus for the present invention will be apparent from the following description in which.

DETAILED DESCRIPTION OF THE INVENTION

Figure 1:
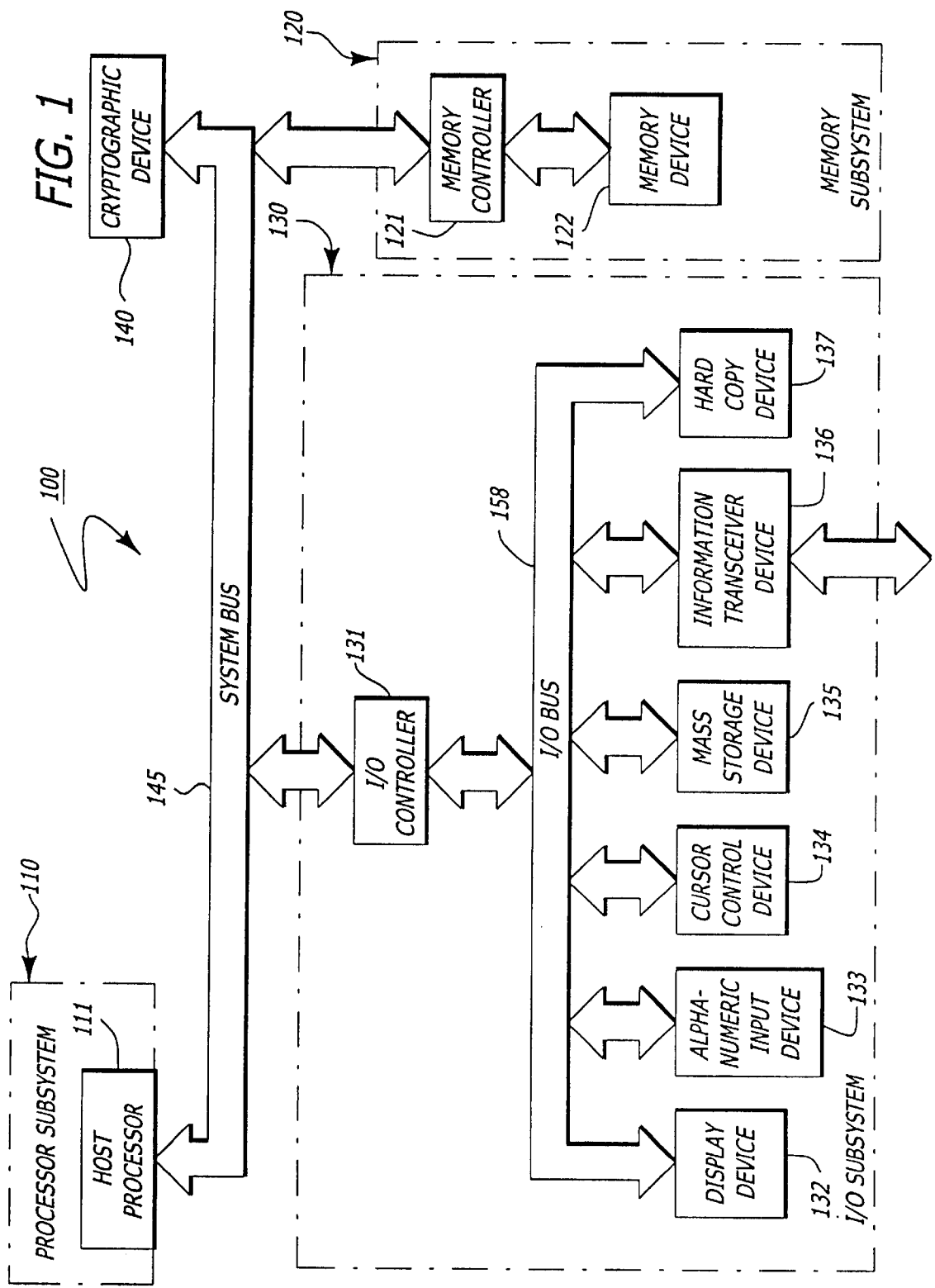
FIG. 1 illustrates a computer system in which the present invention may be implemented.

The present invention relates to an apparatus and method for simultaneous ciphering and hashing. In the following description, numerous details are set forth in order to provide a thorough understanding of the present invention. However, it is apparent to one skilled in the art that the present invention may be practiced through many different embodiments than that illustrated without deviating from the spirit and scope of the present invention. In other instances, well-known circuits, elements and the like are not set forth in detail in order to avoid unnecessarily obscuring the present invention.

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

In the detailed description, a number of cryptography-related terms are frequently used to describe certain characteristics or qualities which is defined herein. A communication key is an encoding and/or decoding parameter used by cryptographic algorithms. For example, the Rivest, Shamir and Adleman (RSA) cryptographic algorithm uses public and private key pairs, while the Data Encryption Standard (DES) algorithm uses a select key shared in confidence between two parties. Normally, the communication key is a sequential distribution ("string") of binary data being "n" bits in length, where "n" is an arbitrary number. A "document" is generally defined as information (e.g., data, address, keys, etc.) being transferred in a sequence of bus cycles. "Plaintext" (also referred to as message) is defined as non-encrypted information which may include, but is not limited to digital data representing text, video, audio and other mediums. "Ciphertext" refers to an encrypted message.

Cryptographic Service Providers (CSPs) are modules that provide secure key storage and cryptographic functions. The CSP modules may be software only or hardware with software drivers. The cryptographic functions provided by the CSPs include a) bulk encryption and decryption, b) digital signaturing, c) cryptographic hash, d) random number generation, and e) key exchange.

A digital signature is a data block that is created by applying a cryptographic signing algorithm to some other data using a secret key. Digital signatures are employed to, inter alia, a) authenticate the source of a message, data, or document; b) verify that the contents of a message have not been modified since it was signed by the sender; and c) verify that a public key belongs to a particular person. Typical digital signaturing algorithms include MD5 with RSA encryption, and DSS, the proposed Digital Signature Standard defined as part of the U.S. government's Capstone project.

A hash algorithm is a cryptographic algorithm used to hash a variable-size input stream into a unique, fixed-sized output value. Hashing is typically used in digital signature processing algorithms. MD and MD2 from RSA Data Security are examples of hash algorithms. MD5, also from RSA Data Security, hashes a variable-size input stream into a 128 bit output value. Secure Hash Algorithm (SHA) that is published by the U.S. Government produces a 160-bit hash value from a variable-size input stream.

A message digest is a "fingerprint" of an input stream. A cryptographic hash function is applied to an input message of arbitrary length and returns a fixed-size output, which is called the digest value.

A symmetric algorithm is a cryptographic algorithm that employs a single secret key for encryption and decryption. Both the sender and receiver must know the secret key. Well-known symmetric functions include Data Encryption Standard (DES) and International Data Encryption Algorithm IDEA. DES was endorsed by the U.S. Government as a standard in 1977 and is an encryption block cipher that operates on 64-bit blocks with a 56-bit key. DES is designed to be implemented in hardware, and works well for bulk encryption. The International Data Encryption Algorithm (IDEA) is one of the best known public algorithms and uses a 128-bit key.

Asymmetric algorithms are cryptographic algorithms where one key is used to encrypt plaintext and, a second key is used to decrypt ciphertext. Asymmetric algorithms are also known as public-key algorithms. One key is called the public key, and the other key is called the private key or secret key. The Rivest-Shamir-Adelman (RSA) algorithm is the most commonly used public-key algorithm. The Rivest-Shamir-Adelman algorithm can be employed for encryption and for signing.

Digital certificate—The binding of some identification to a public key in a particular domain, as attested to directly or indirectly by the digital signature of the owner of that domain. A digital certificate is an unforgeable credential in cyberspace. The certificate is issued by a trusted authority, covered by that party's digital signature. The generation of a digital certificate employs the hash operation. The certificate can attest to the certificate holder's identity, or can authorize certain actions by the certificate holder. A certificate may include multiple signatures, and can attest to multiple objects or multiple actions.

DES private key is a cryptographic key employed to decipher ciphertext in private-key cryptography. This key is kept secret by its owner.

Verification is the process of comparing two message digests. One message digest is generated by a message sender and is included in the message. The message recipient computes the digest again. If the message digests are exactly the same, the integrity of the message is assured (i.e., one is assured that there is no message tampering of the contents by a third party between the sender and the receiver). The process of verification employs the hash operation.

Referring to FIG. 1, an illustrative embodiment of a computer system 100 utilizing the present invention is illustrated. The computer system 100 comprises a plurality of subsystems including a processor subsystem 110, a memory subsystem 120 and an input/output (I/O) subsystem 130. These subsystems and a cryptographic device 140 are coupled together through a system bus 145 which enables information to be communicated between the subsystems and the cryptographic device 140. It is contemplated that the cryptographic device 140 may alternatively be coupled to an I/O bus 158 (e.g., a PCI bus or ISA bus), a local bus within a host processor 111 or any bus mechanism.

The processor subsystem 110 includes the host processor 111 which executes instructions from the memory subsystem 120 and processes information from the computer system 100. While only one host processor 111 is shown, it is contemplated that more than one processor could be employed within the computer system 100. Moreover, the memory subsystem 120 may include a memory controller 121 controlling access to one or more memory device(s) 122 such as dynamic random access memory ("DRAM"), read only memory ("ROM"), video random access memory ("VRAM") and the like. The memory device(s) 122 store(s) information for use by the host processor 111.

The I/O subsystem 130 includes an I/O controller 131 which acts as an interface between an I/O bus 158 and the system bus 145. This provides a communication path for transferring information between devices coupled to different buses. The I/O bus 158 transfers information into and from at least one peripheral device in the computer system 100. Examples of the peripheral devices may include, but are not limited to a display device 132 (e.g., cathode ray tube, liquid crystal display, flat panel display, etc.); an alphanumeric input device 133 (e.g., keyboard, key pad, etc.); a cursor control device 134 (e.g., a mouse, trackball, touchpad, joystick, etc.); a mass data storage device 135 (e.g., magnetic tapes, hard disk drive, floppy disk drive, etc.); an information transceiver device 136 (fax machine, modem, scanner etc.) allowing information to be transferring from the computer system 100 to a remotely located system and vice versa; and a hard copy device 137 (e.g., plotter, printer, etc.). It is contemplated that the computer system 100 shown in FIG. 1 may employ some or all of these components or different components than those illustrated.

Besides a computer system, it is further contemplated that the cryptographic device 140 may be implemented in any electronic system that relies on encrypted communications. For example, these electronic systems may include cable television control boxes, bank ATM machines and perhaps networked peripheral nodes that could be configured to receive information in one encrypted format and transmit or store the information in another encrypted format. These examples are illustrative and should not be construed as a limitation to the present invention.

Figure 2:
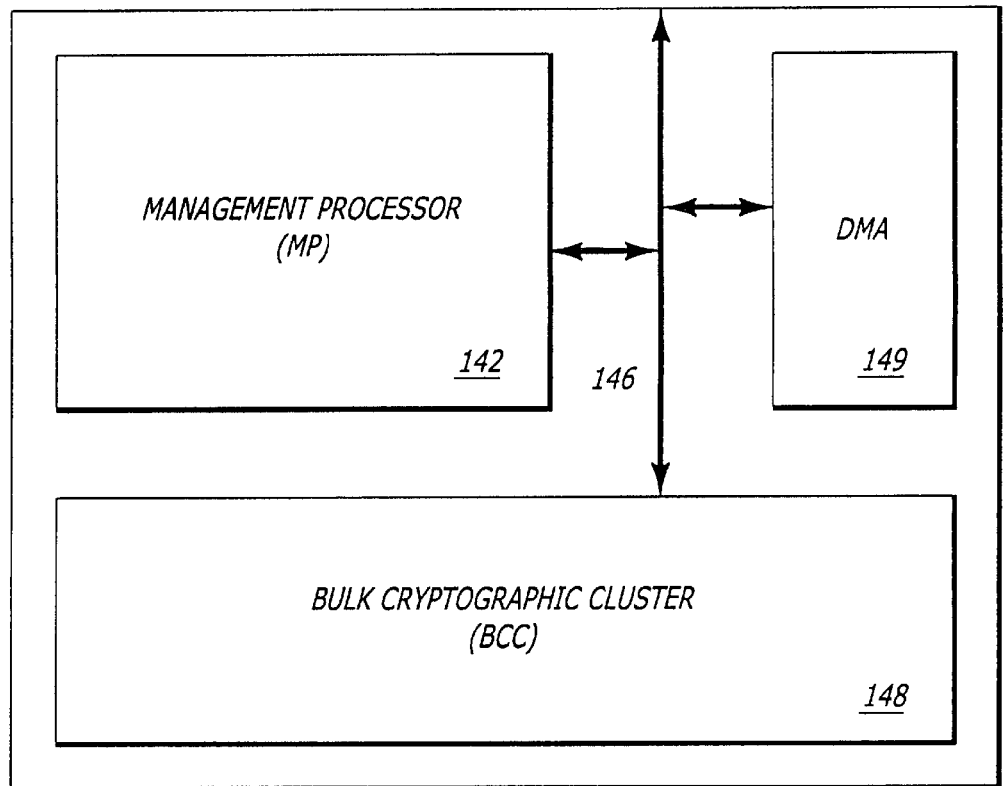
FIG. 2 illustrates a block diagram of the cryptographic device of FIG. 1 that employs the present invention.

FIG. 2 illustrates a block diagram of a cryptographic device 140 employing the present invention. The cryptographic device 140 includes an integrated hash and cipher unit hereinafter referred to as a Bulk Cryptographic Cluster (BCC) 148 that is coupled to an intelligent device 142 (e.g., a microprocessor), hereinafter referred to as a Management Processor (MP). The BCC 148 provides cryptographic services to the MP 142. The Bulk Cryptographic Cluster (BCC) 148 performs ciphering operations (i.e., encrypting/decrypting) in parallel with hashing operations on a block of data. The ciphering and hashing operations occur concurrently or in parallel and are atomic (i.e., until both the activities are complete, no reload of data is permitted).

In this embodiment of the present invention, the ciphering operation implements a DES algorithm for encrypting and decrypting the data and a SHA or MD5 algorithm for hashing the data. However, it will be understood by those skilled in the art that the teachings of the present invention are applicable to any block ciphering and hashing algorithm.

The Management Processor (MP) 142 is responsible for providing data to the BCC 148 via bus 146. Software, executing on the MP 142, configures a Direct Memory Access (DMA) 144 unit to stream data into the BCC 148. The DMA unit 144 checks to determine if the BCC 148 is busy. If the BCC 148 is not busy, the DMA unit 144 streams data into the BCC 148. Once the entire message has been ciphered, as well as hashed, the application, executing on the MP 142, reads the ciphertext and a hash value, corresponding to the plaintext from the BCC 148.

During decryption software, executing on the MP 142, verifies this hash value against the Hash Value passed to as part of the Digital Signature attached with the message and thus authenticates the message. During encryption software, executing on the MP 142, creates a Digital Signature using this hash value and appends it to the message.

Figure 3:
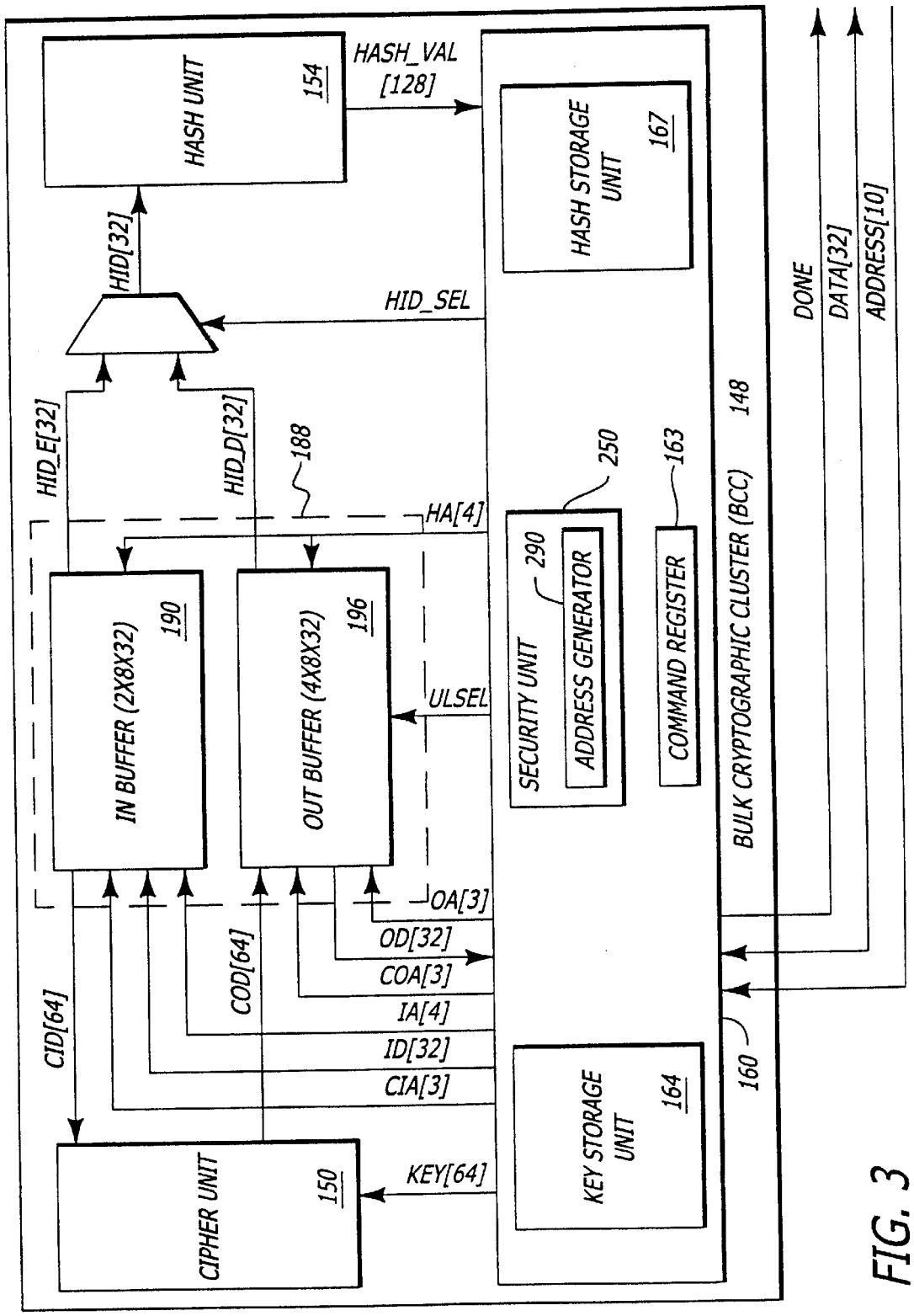
FIG. 3 illustrates a block diagram of one embodiment of the integrated cipher and hash unit of the present invention.

FIG. 3 illustrates a block diagram of one embodiment of the BCC 148. The BCC 148 includes a cipher unit 150 that performs the encryption and decryption operations on plain text and encrypted text, respectively. The cryptographic device of the present invention, also includes a hash unit 154 for performing a hash operation on plain text to generate an associated signature. The algorithms used to determine the functionality of both the cipher unit and the hash unit are described in a publication entitled "Applied Cryptography Second Edition: Protocols, Algorithms, and Source Code in C" by Bruce Schneier published in 1996. It will be noted by those skilled in the art that the cipher unit 150 can be implemented with specific dedicated hardware components for encryption and decryption or as a software routine. Similarly, those skilled in the art will appreciate that the hash unit 154 can be implemented with dedicated hardware components or as a software routine. As noted previously, the hash unit includes an input for receiving plain text and an output for providing a generated signature based on the plain text. The hash unit does not operate on ciphertext (i.e., encrypted text).

The BCC 148 also includes a control unit 160. The control unit 160 also includes a command register 163 that is writeable by the MP 142. In this embodiment, the command register 163 is a 32 bit wide register holding a 32 bit command that indicates to the BCC 148 the specific algorithm to execute for ciphering (e.g., DES or its variants) and the hashing algorithm to be performed (e.g., MD5 or SHA). The command also indicates a specific key in a key storage unit 164 to be employed during the ciphering operation. The key storage unit 164, which may be implemented by a random access memory (RAM), stores a plurality of keys with each key corresponding to a particular variation of DES. In this embodiment, the key storage unit 164 includes 64-bit keys and a total of twelve keys can be stored therein. The storage unit 164 is writeable by the MP 142 as twenty-four 32-bit words.

The control unit 160 also includes a hash storage unit 167 that stores a 128 bit hash value generated by the hash unit 154. The hash storage unit 167 is written to by the hash unit 154 as a 128 bit entity and is read by the control device as four 32-bit words.

The control unit 160 also includes a security unit 250. The security unit 250 is responsible for sequencing the Hash and Cipher datapaths through the proper data-sets as well as generating a signal (DONE) to indicate to the DMA that the BCC 148 is finished with the current data and is ready to accept more data (e.g., the next block of data). The security unit 250 will be described in greater detail hereinafter.

The BCC 148 includes a buffer unit 188. Buffer Unit 188 includes an IN BUFFER 190 and an OUT BUFFER 196. The IN BUFFER 190 and the OUT BUFFER 196 will be described in greater detail hereinafter.

The security unit 250 also includes an Address Generator 290 that controls the generation of appropriate read and write addresses for the IN BUFFER 190 and the OUT BUFFER 196.

The interaction of the Management Processor (MP) 142, the Direct Memory Access unit (DMA) 144, and the Bulk Cryptographic Cluster (BCC) 148 can be summarized in the following steps:

1. The MP configures the DMA 144 to stream data to the BCC 148.
2. The DMA 144 performs step (1) only if the BCC 148 is not busy (i.e. the BCC 148 is asserting a DONE signal).
3. The DMA 144 streams appropriate data into the BCC 148 and waits for the DONE while the message length is not exhausted.
4. Repeat step (3) until message length is exhausted.
5. If the message is exhausted, the DMA 144 informs the MP 142 through an interrupt.

An overview of how the management process (MP) 142 and the DMA 144 interface with the BCC 148 will now be described. The interface signals employed by the control device to interface with the BCC 148 are illustrated in Table 1.

TABLE 1

| Signal | In/Out | Description |
|---|---|---|
| ADDRESS[10] | IN | Address bus |
| ADS | IN | Address Strobe |
| RWN | IN | Read Write signal (Read active high) |
| DATA[32] | INOUT | Bi-directional data bus |
| DONE | OUT | Signal indicating to the control device (e.g., microprocessor) that the BCC is ready to accept new data |

The processing steps involved in the encryption mode and decryption modes will be described hereinafter with reference to FIGS. 4 and 5.

Figure 4:
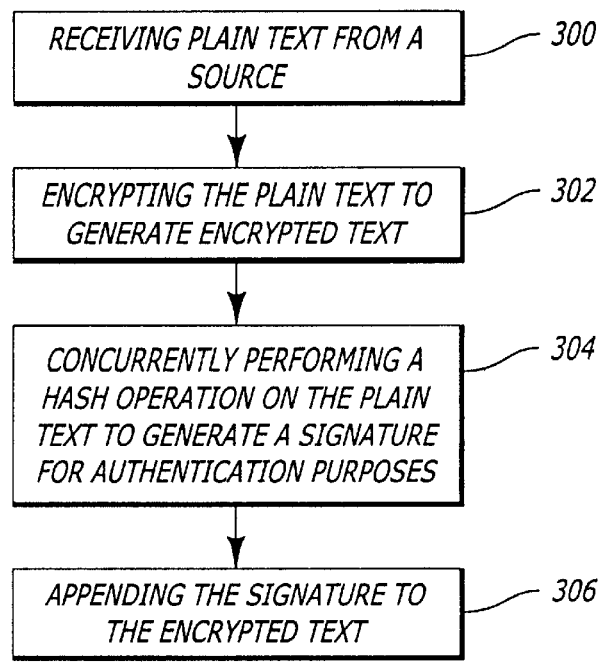
FIG. 4 is a flowchart illustrating the processing steps performed by one embodiment of the present invention when the encryption mode is selected.

FIG. 4 is a flowchart illustrating the operations performed by one embodiment of the present invention when the encryption mode is selected. In block 300, the present invention receives plain text from a source. In block 302, the plain text is encrypted to generate encrypted text. In block 304, while encrypted text is being generated, a hash operation is concurrently performed on the plain text to generate a signature, associated with the plain text that is used for authentication purposes. In block 306, the signature is appended to the encrypted text and provided to the control or requesting device.

Figure 5:
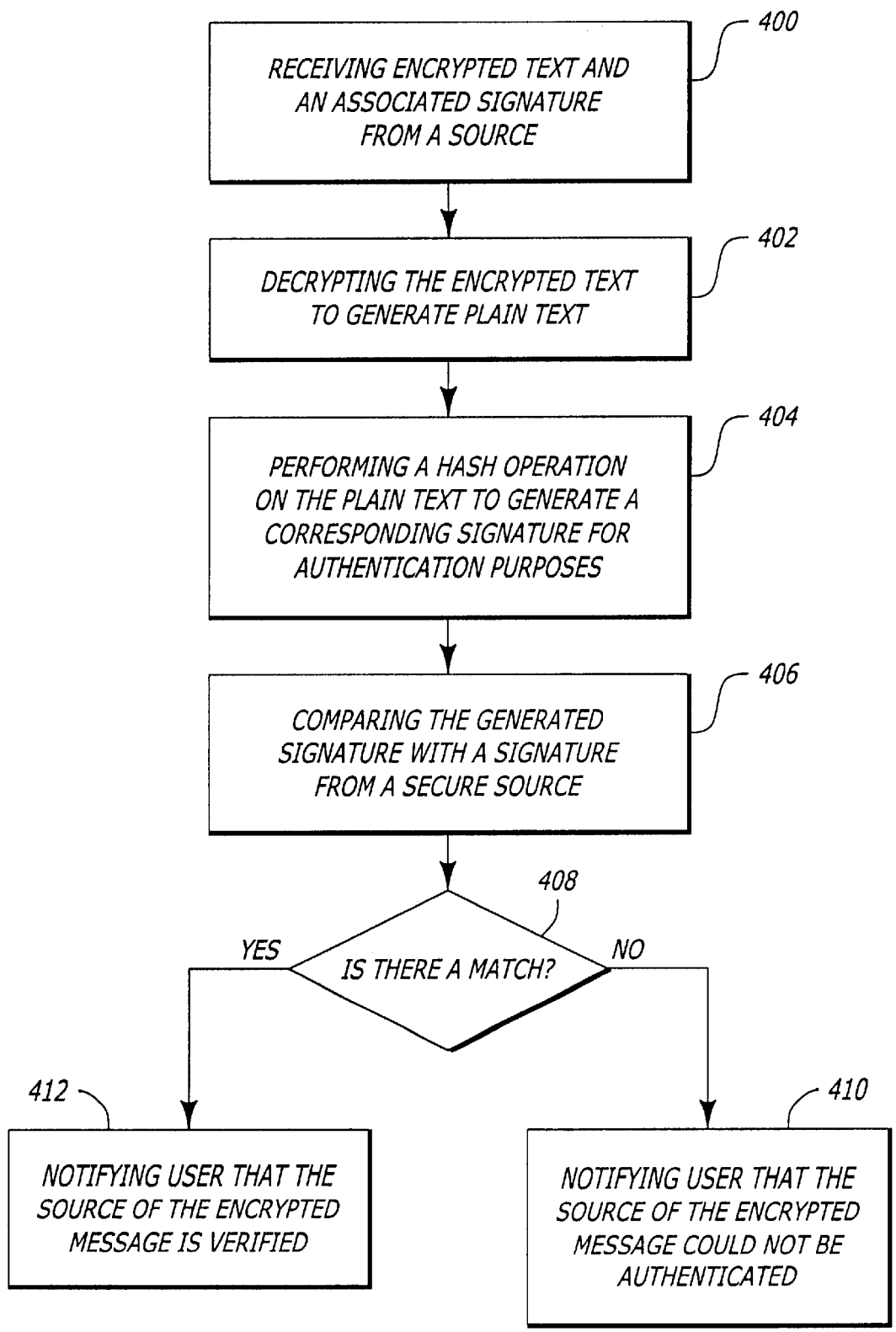
FIG. 5 is a flowchart illustrating the processing steps performed by one embodiment of the present invention when the decryption mode is selected.

FIG. 5 is a flowchart illustrating the processing steps performed by one embodiment of the present invention when the decryption mode is selected. In block 400, encrypted text and an associated signature is received from a source. In block 402, the encrypted text is decrypted to generate plain text. In block 404, a hash operation is performed on the plain text to generate a corresponding signature that will later be used for authentication purposes. In block 406, the generated signature is compared with a signature from a secure source. In decision block 408, an application executing on the MP 142 takes appropriate action. For example, if the determination in decision block 408 is no, the user can be notified that the source of the encrypted message is not authenticated (block 410). In an alternative example, if the determination in decision block 408 is yes, the user can be notified that the encrypted message is verified (block 412).

Table 2 provides the definition of signals internal to the cryptographic device 140 of Figure. Each of these signals will be described in further detail hereinafter with regard to the Address Generator 290.

TABLE 2

| Signal | From | To | Description |
|---|---|---|---|
| CID[64] | IN BUFFER | CIPHER UNIT | Input data to the cipher unit |
| CIA[3] | CONTROL UNIT | IN BUFFER | Address for the cipher unit input data |
| ID[32] | CONTROL UNIT | IN BUFFER | Data from the external data bus, DATA[32], to the input buffer |
| IA[4] | CONTROL UNIT | IN BUFFER | Input address for loading the input buffer |
| IWSTRB | CONTROL UNIT | IN BUFFER | Write strobe for input buffer |
| COD[64] | CIPHER UNIT | OUT BUFFER | Output Data from the cipher unit post ciphering |
| COA[3] | CONTROL UNIT | OUT BUFFER | Address for post ciphered data to be loaded into the OUT BUFFER |
| OD[32] | OUT BUFFER | CONTROL UNIT | Data from the output buffer to be transmitted to the external data bus |
| OA[4] | CONTROL UNIT | OUTPUT BUFFER | Address of data to be read out |
| OWSTRB | CONTROL UNIT | OUTPUT BUFFER | Write strobe for output buffer |
| ULSEL | CONTROL UNIT | OUTPUT BUFFER | Qualifies whether the cipher unit is operating on the upper or lower half of the output buffer. The hash unit operates on the part that the cipher unit is not operating on. |
| KEY[64] | CONTROL UNIT | CIPHER UNIT | 64 bit Key for the DES algorithm |
| HA[4] | CONTROL UNIT | OUT and IN BUFFER | Address for data to be presented to the Hash Unit |
| HID_E[32] | IN BUFFER | HASH UNIT | Input data to the hash unit (to be used during encryption) |
| HID_D | OUT BUFFER | HASH UNIT | Input data to the hash unit (to be used during decryption) |

TABLE 2-continued

| Signal | From | To | Description |
|---|---|---|---|
| HASH_VAL | HASH UNIT | CONTROL UNIT | Hash value (to be stored away in the hash store) |
| HID_SEL | CONTROL UNIT | HASH IN MUX | Hash input data selector |

Figure 6:
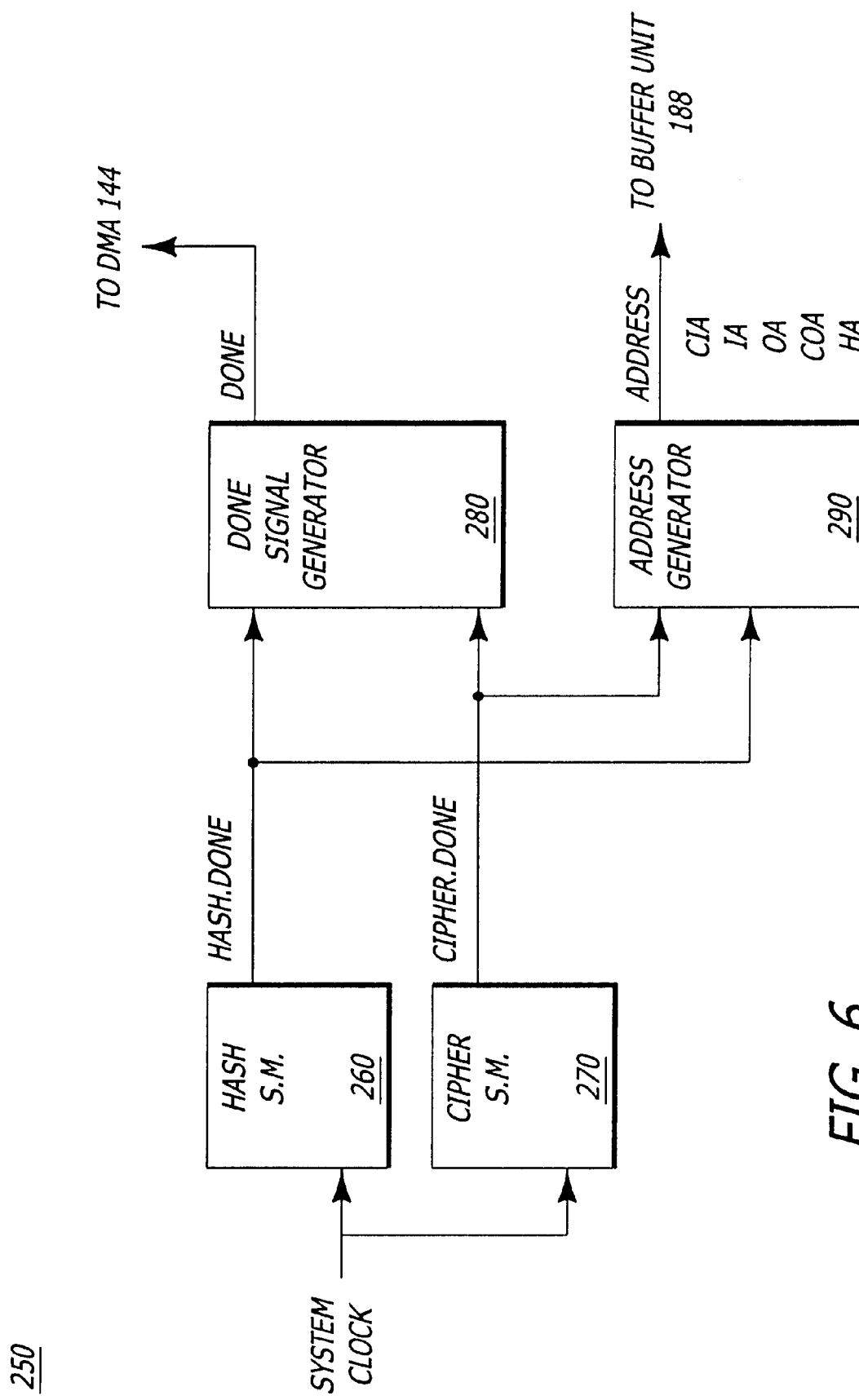
FIG. 6 illustrates in greater detail the security enhancement unit of FIG. 3.

FIG. 6 illustrates in greater detail the security unit 250 of FIG. 3. The security unit 250 includes the following functional units, which may be implemented as a single functional block or as distributed functional blocks. The security unit 250 insures that the cipher unit 150 and the hash unit 154 operate on the same set of data (e.g., the same data block) and that no new data is presented to the cipher unit 150 and the hash unit 154 until both units have completed the processing on the current data block.

The security unit 250 includes a hash state machine 260 that has a first input for receiving a system clock and an output for providing a HASH.DONE signal. The hash state machine 260 may be implemented with a counter that counts the clock cycles of the system clock until a predetermined number. The predetermined number corresponds to the number of clock cycles for the hash unit 154 to process a data block and varies depending on the particular hash algorithm employed.

The security unit 250 includes a cipher state machine 270 that has an input for receiving the system clock and an output for providing a CIPHER.DONE signal. The cipher state machine 270 may be implemented using a counter that counts the number of clock cycles until a predetermined value. The predetermined value corresponds to the number of clock cycles that the cipher unit 150 takes to complete processing a data block. The security unit 250 indudes a DONE signal generator 280 that has a first input for receiving the HASH.DONE signal from the hash state machine 260 and a second input for receiving the CIPHER DONE signal from the cipher state machine 270. Based on the HASH.DONE signal and the CIPHER.DONE signal, the DONE signal generator 280 generates a DONE signal to the computer system to indicate that processing of a current data block has been completed by both the cipher unit 150 and the hash unit 154.

The security unit 250 also includes an address generator 290 that has a first input for receiving the HASH.DONE signal, and a second input for receiving the CIPHER.DONE signal. The address generator 290 accesses the buffer (190 and 196), and is employed by the present invention to insure that no new data is provided to the cipher unit 150 and the hash unit 154 until processing for the current data block is completed by both units 150 and 154. The address generator 290 also insures that the same data block is provided to the cipher unit 150 and the hash unit 154.

Addressing the Input BUFFER (IN BUFFER)

In this embodiment, the IN BUFFER 190 is a FIFO buffer implemented as a triple ported register RAM that is capable of supporting two read ports and one write port. The IN BUFFER 190 is separated out into odd and even arrays which can be read as a combination (64 bits) or individually (32 bits). The writes to this RAM are always 32 bits. The total size of this RAM is 512 bits.

There are three pairs of address-data lines employed to access the IN BUFFER 190. These address-data lines are (CIA and CID), (HA and HID_E) and (IA and ID). The cipher unit 150 employs address lines CIA and data lines CID to access the IN BUFFER 190. CIA is a 3 bit wide signal and simultaneously addresses the odd and even banks of the IN BUFFER 190. The IN BUFFER 190 outputs 64 bits of data at the location indicated by CIA onto the CID bus. Data from the location CIA&'0' is placed on CID[31-0], and data from the location CIA&'1' is placed on CID [63-32]. CIA is incremented according to the following logic equations:

if ((IA−CIA&"0">=2) and (cipher_block_done)) then

CIA<=CIA+'1';

else

CIA<=CIA;

end if;

The cipher state machine 270 computes the time taken by the cipher unit 150 to process the data (which depends on the algorithm being executed by the cipher unit 150 as indicated in the command register) and asserts the signal cipher_block_done. Once the entire data in the IN BUFFER 190 has been processed by the cipher unit the address generator 290 terminates further processing by not incrementing CIA any further.

The subequation (IA−CIA&"0">=2), that is imposed on address generator 290 ensures that the Cipher Unit 150 has 64 bits of valid data to process.

The hash unit 154 employs address lines HA and data lines HID_E to access the IN BUFFER 190. HA is a 4 bit wide signal and addresses the IN BUFFER 190 as a 32 bit wide entity. The IN BUFFER 190 outputs 32 bits of data at the location indicated by HA on the HID_E bus. The hash unit 154 address generates the HA according to the following logic equation:

if ((IA>=next_ha) and (current_step_done)) then

HA<=next_ha;

else

HA<=HA;

end if;

The signal next_ha is the address of the next 32 bit word which the Hash Algorithm needs (see "Applied Cryptography Second Edition: Protocols, Algorithms, and Source Code in C" by Bruce Schneider, published in 1996). The signal current_step_done is asserted when the Control Unit 160 determines that the Hash Unit 154 is done processing the current 32 bit word.

The address generator 290 employs address lines IA and data lines ID to write input data to the IN BUFFER 190.

These address and data lines (IA and ID) are assigned according to the following set of equations:

```
IA<=ADDRESS[3-0];
ID<=DATA;
if (in_buffer_address_match) then
    IWSTRB<=not(RWN);
else
    IWSTRB<='0';
end if;
```

The IN BUFFER 190 writes the data on ID into the location indicated by IA when IWSTRB is high. The signal in_buffer_address_match is asserted if the address generator 290 decodes the upper bits of the ADDRESS bus to match to the memory region where the IN BUFFER 190 is mapped.

Addressing the Output BUFFER (OUT BUFFER)

The OUT BUFFER 196 is a triple ported register RAM capable of supporting two read ports and one write port. It is separated out into odd and even arrays which can be read as 32 bits or written to as one 64 bit word. The total size of this RAM is 1024 bits.

The OUT BUFFER 196 is accessed by employing three sets of address-data lines. These sets of address-data lines include (COA and COD) (HA and HID_D), and (OA and OD).

The address generator 290 employs address lines COA and data lines COD to access the OUT BUFFER 196. The OUT BUFFER 196 writes the lower 32 bits on the COD data bus into the even half of the odd-even pair of locations addressed by the COA address bus (COA&'0') and the upper 32 bits into the odd half (COA&'1'). The logic for determining the writing of data into the OUT BUFFER 196 is determined by the following set of equations:

```
if (cipher_block_done) then
    COA<=COA+'1';
    OWSTRB<='1';
else
    COA<=COA;
    OWSTRB<='0';
end if;
```

The writing of the data happens when the functional block asserts OWSTRB. The functional block asserts signal ULSEL, which is used to determine whether to write to the upper or lower half of the OUT BUFFER 196 as explained hereinafter.

The address generator 290 employs address lines HA and data lines HID_D to access the OUT BUFFER 196. The OUT BUFFER 196 presents data at the location HA (in coordination with the ULSEL signal as explained hereinafter) on the HID_D. The address generator 290 generates HA as described previously.

The address generator 290 employs address lines OA and data lines OD to read or unload the OUT BUFFER 196 by asserting 0A<=ADDRESS[4-0].

Using Upper and Lower Halves of the OUT BUFFER

In a preferred embodiment, the capacity of the OUT BUFFER 196 is twice that of the IN BUFFER. This configuration allows the pipelining of the ciphering and hashing operations during decryption.

During encryption the hash unit 154 and the cipher unit 150 receive inputs (plain text) from the same source (i.e. the IN BUFFER 190). However, during decryption, the Cipher Unit 150 receives input from the IN BUFFER 190 while the Hash Unit 154 receives input from the OUT BUFFER 196 which in this case contains plain text. If the OUT BUFFER were the same size as the IN BUFFER 190, the Cipher Unit would have to stall while the Hash Unit 154 processed the data in the OUT BUFFER 196. Doubling the storage in the OUT BUFFER 196 allows the address generator 290 to "ping-pong" between the upper and lower halves of the OUT BUFFER 196.

In the preferred embodiment, the Cipher Unit 150 and the Hash Unit 154 are allotted complementary halves of the OUT BUFFER 196. When the output of the ciphering operation is happening on the upper half of the OUT BUFFER 196, hashing is happening on data in the lower half and vice versa. The signal ULSEL, generated by the address generator 290 indicates to the OUT BUFFER 196 whether the cipher unit 150 is writing data to the upper or lower half of the OUT BUFFER 196.

The functional block generates the cipher_write_address, hash_read_address addresses for the OUT BUFFER 196 based on the following equations:

```
cipher_write_address<=ULSEL&COA;
hash_read_address<=not(ULSEL)&HA;
```

The address generator 290 generates and provides cipher_write_address and hash_read_address signals to the OUT BUFFER 196. The address generator 290 employs these signals to write the output of the Cipher Unit 150 to OUT BUFFER 196 and read data for the Hash Unit 154.

Determination of Completion

The security unit 250 determines completion of the hashing and ciphering. To increase security of the system, atomicity of data blocks are important. Accordingly, the address generator 290 of the security unit 250 does not overwrite data in the IN BUFFER 190, while data is still being processed by either the cipher unit 150 or the hash unit 154. The hash state machine 260 in response to the hash_block_done signal, the hash_block signal, and the last_hash_block signal selectively generates the hash_done signal. The cipher state machine 270 in response to the cipher_block_done signal, the cipher_block signal, and the last_cipher_block signal selectively generates the cipher_done signal. Specifically, the hash state machine 260 and the cipher state machine 270 selectively generates the hash_done signal and the cipher_done signal, respectively, in accordance with the following equations:

```
cipher_done<=cipher_block_done. (cipher_block=last_cipher_
    block);
hash_done<=hash_block_done. (hash_block=last_hash_block);
```

As noted previously, the signals cipher_block_done and hash_block_done are asserted by cipher state machine 270 and hash state machine 260, respectively, at the end of processing each block of data by the respective units. Note that the cipher_block is equal to last_cipher_block when CIA="111". For the hash operation, since there is only one block to process, the hash_block signal is always equal to last_hash_block.

Figure 7:
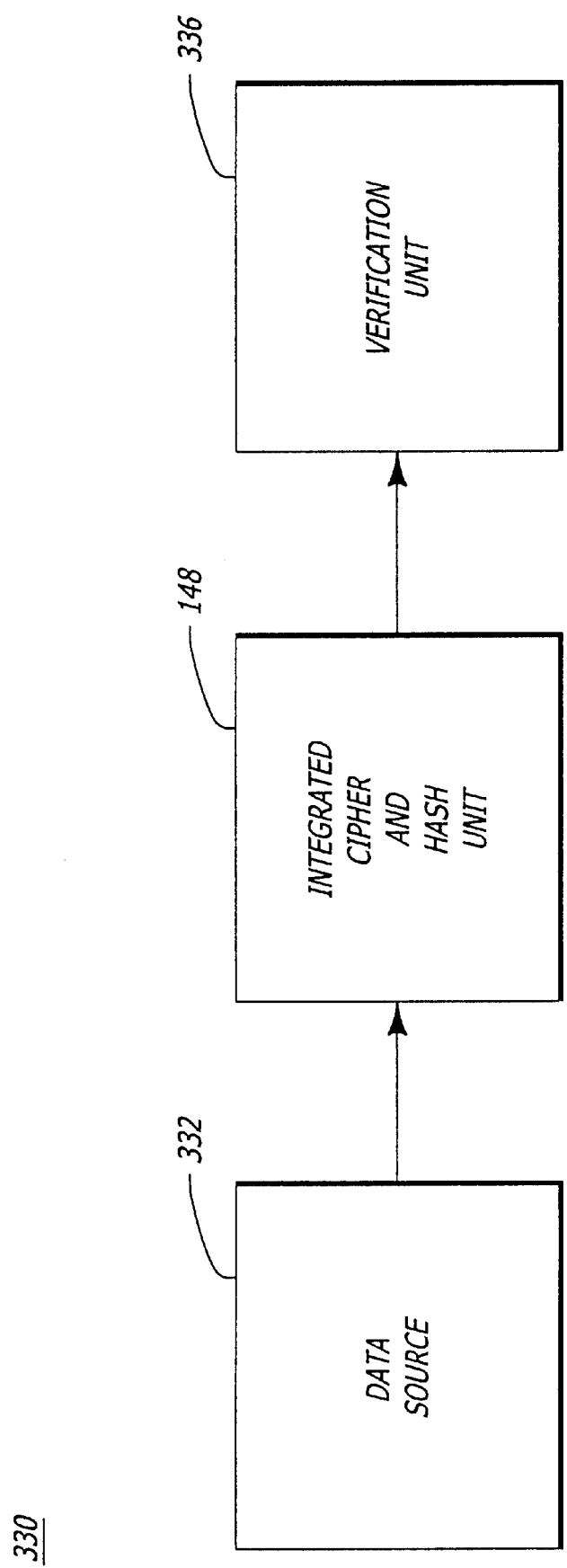
FIG. 7 illustrates a data processing system in which the integrated cipher and hash unit of the present invention may be implemented.

The DONE signal generator 280 generates the DONE signal based on hash_done and cipher_done in accordance with the following equation:

DONE<=cipher_done.hash_done;

FIG. 7 illustrates a data processing system in which the integrated ciphering and hashing unit of the present invention may be implemented. The Data Transaction System 330 (herein also referred to as a data transaction system) is simply a system through which data passes. This Data Transaction System 330 includes a Data Source 332 that provides plain text to the Data Transaction System 330. The Data Source 332 can be an ATM machine, a point of sale terminal or any other unit that takes data and transmits that data to a Verification Unit 336 that verifies the information. The Data Source 332 may include a keyboard, a magnetic reading device for reading a magnetic stripe on a card (e.g., card or a ATM card), and a communications line (e.g., telephone line).

The Integrated Cipher and Hash Unit (e.g., the BCC) 148 of the present invention is coupled between the Data Source 332 and the Verification Unit 336. The Integrated Cipher and Hash Unit 148 provides services that are important in maintaining the confidentiality of the data plaintext sent between the Data Source 332 and the Verification Unit 336. The Verification Unit 336 can be implemented as MP 142, shown in FIG. 2, executing software code to verify the source of a message. Moreover, the Integrated Cipher and Hash Unit 148 provide important services in insuring the secure transfer of data between the Data Source 332 and the Verification Unit 336. For example, the Integrated Cipher and Hash Unit 148 authenticates the origin of the data, verifies that the message has not be modified in transit, the also ensures that the sender of the message cannot at a later time deny having sent the message.

Figure 8:
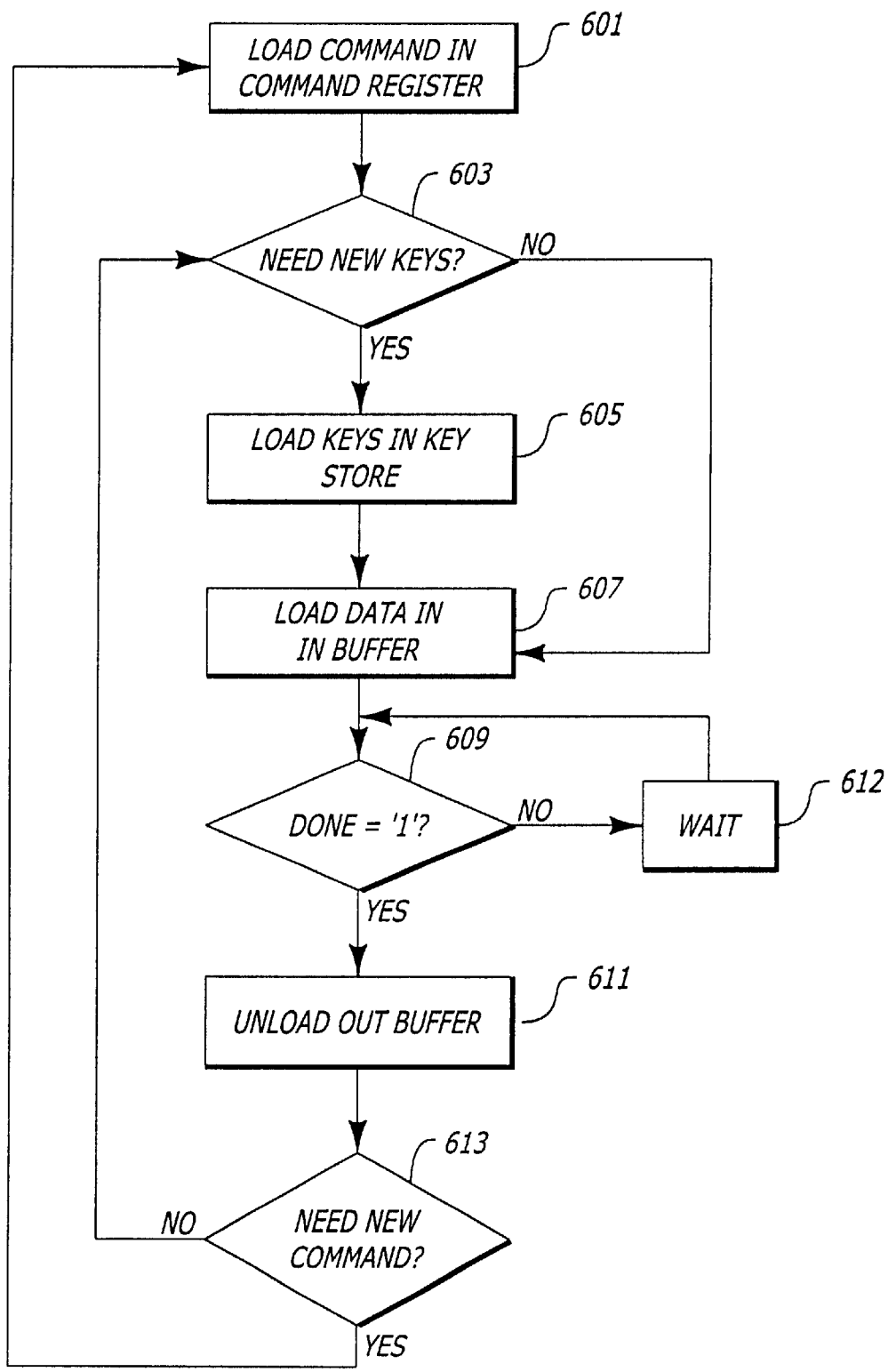
FIG. 8 is a flowchart illustrating the operations for accessing the integrated cipher and hash units.

FIG. 8 is a flowchart illustrating the operations on of how a control device accesses the BCC 148. In block 601, the MP 142 writes to the command register 163 of the BCC 148 by applying the address of the command register on the ADDRESS bus, asserting the ADS signal, deasserting the RWN signal and supplying the specific command on the DATA bus. As noted previously, the command has information on 1) the specific encryption algorithm to be employed (e.g., the specific mode of DES); 2) the specific key in the key storage unit to be employed for ciphering operations; and the specific hash algorithm to use (SHA or MD5). In decision block 603, a determination is made whether or not new keys are needed. If yes, new keys are loaded into the key storage unit 164 (block 605). If no, the data is loaded into the input buffer 190 (hereinafter known as IN BUFFER) (block 607).

To load new keys into the key storage unit 164, the MP 142 applies the address of the appropriate key storage location onto the ADDRESS bus, asserts the ADS signal, deasserts the RWN signal and supplies the lower/upper 32 bits of the key onto the DATA bus.

To begin loading data into the IN BUFFER 190 of the cryptographic device 140, the MP 142 simply applies the address of the appropriate IN BUFFER location onto the ADDRESS bus, asserts ADS, deasserts RWN and supplies the data to be processed onto the DATA bus. Once data begins to be written to the IN BUFFER, the DONE signal generator 280 of the security unit 250 deasserts the DONE signal. The DONE signal is deasserted until there is valid data in the output buffer 196 (hereinafter known as OUT BUFFER). Once the BCC 148 is finished processing the particular block of data (i.e., the cipher unit and the hash unit have completed processing of that particular block of data), the DONE signal generator 280 asserts the DONE signal and keeps it asserted until the next data block begins to be written into the IN BUFFER. In determination block 609, a determination is made whether or not the DONE signal is asserted. If yes, the BCC 148 can begin to unload data from the OUTPUT BUFFER 196 by employing the address generator 290 (block 611). If no, the address generator 290 waits for the DONE signal to be asserted before loading the next block of data (block 612).

Once the DONE is asserted, the OUTPUT BUFFER 196 of the BCC can be read out on the data bus by the MP 142. The MP 142 simply presents the address of the appropriate OUT BUFFER 196 location on the ADDRESS bus, asserts the RWN signal and strobes the ADS signal. In determination block 613, a determination is made whether or not a new command is needed. If no, the processing proceeds to decision block 603. If yes, the processing proceeds to processing step 601.

Accordingly, an Integrated Cipher and Hash Unit 148 that performs the cipher operation and hash operation in parallel has been described. The security enhancement unit of present invention improves performance and ensures that the hash unit and cipher unit operate on a same block of data. Furthermore, the Security Enhancement Unit of the present invention ensures that the hash and cipher units do not process new data (i.e., the next block of data) until both units have completed processing the current data block, whereby security is greatly enhanced.

In the foregoing specification, the invention has been described with reference to specific exemplary embodiments thereof. It will however be evident that various modifications and changes may be made thereto without departing from the broader spirit and scope of the invention as set forth in the appended claims. The specification and drawings are accordingly to be regarded as illustrative rather than restrictive.

What is claimed is:

1. A cryptographic device comprising:
    a) a cipher unit to perform a ciphering operation on a first block of data;
    b) a hash unit to perform a hash operation on a second block of data generally in parallel with the ciphering operation; and
    c) a security enhancement unit coupled to the cipher unit and the hash unit, the security enhancement unit ensuring that both the cipher unit and the hash unit have completed processing of the first and second blocks of data before additional input data is provided to the cipher unit and the hash unit.

2. The cryptographic device of claim 1 further comprising:
    an input buffer to receive the input data.

3. The cryptographic device of claim 1, wherein the security enhancement unit includes an address generator, coupled to the input buffer, the address generator ensuring that the input buffer is not overwritten until the cipher unit and the hash unit have both completed processing the respective first and second blocks of block.

4. The cryptographic device of claim 3, wherein the security enhancement unit further includes a signal generator, the signal generator having a first input for receiving a first signal indicating that the cipher unit has completed processing the first block of data, and a second input for receiving a second signal indicating that the hash unit has completed processing the second block of data, the signal generator responsive to the first and second signals by generating a DONE signal indicating to an external device that the cryptographic device is ready for the additional input data.

5. The cryptographic device of claim 1, wherein the first block of data is equal in size to the second block of data.

6. The cryptographic device of claim 1, wherein the cipher unit performs encryption and decryption on the data block.

7. The cryptographic device of claim 1, wherein the second block of data is at least twice the size than the first block of data.

8. The cryptographic device of claim 1 further comprising an output buffer coupled to the cipher unit, the hash unit and the security enhancement unit.

9. The cryptographic device of claim 1, wherein the input buffer includes a triple parted register random access memory.

10. The cryptographic device of claim 1, wherein the security enhancement unit includes a first input, the input indicating to the security enhancement unit that the slower of the cipher unit and hash unit have completed processing, the security enhancement unit generating a DONE signal based on the input signal, the security enhancement unit providing the DONE signal to the faster of either the cipher unit or the hash unit.

11. The cryptographic device of claim 8, further comprising a selector having inputs coupled to both the input buffer and the output buffer and an output coupled to the hash unit.

12. A data processing system comprising:
   a) a data source for providing a current data block to be ciphered and hashed;
   b) an integrated cipher and hash unit coupled to the data source, the integrated cipher and hash unit including a cipher unit to perform a ciphering operation on the current data block, a hash unit to perform a hash operation concurrently on the data block, and a security enhancement unit to ensure that both the cipher unit and the hash unit have completed processing the current data block before a next data block is received from the data source.

13. The data processing system of claim 12, wherein the integrated cipher and hash unit further includes an input buffer for receiving the current data block.

14. The data processing system of claim 13, wherein the security enhancement unit includes an address generator, coupled to the input buffer, the address generator to ensure that the input buffer having the current data block is not overwritten until the cipher unit and the hash unit have both completed processing the current data block.

15. The data processing system of claim 14, wherein the security enhancement unit further includes a signal generator, the signal generator having a first input for receiving a first signal indicating that the cipher unit has completed processing the current data block, and a second input for receiving a second signal indicating that the cipher unit has completed processing the current data block, the signal generator responsive to the first and second signals selectively generates a DONE signal indicating to an external device that the integrated cipher and hash unit are ready for the next data block.

16. The data processing system of claim 12, wherein the cipher operation operates on 64-bit portions of the current and the hash operation operates on 512 bit portions of the current data block.

17. The data processing system of claim 12, wherein the cipher unit performs encryption and decryption on the data block.

18. The data processing system of claim 12, wherein said ciphering operation is in accordance with a DES scheme.

19. The data processing system of claim 12, wherein the hash operation is in accordance with one of an MD5 scheme and an SHA scheme.

20. The data processing system of claim 12, further comprising a verification unit coupled to the integrated cipher and hash unit.

21. A method comprising:
   performing a ciphering operation on a first block of input data; and
   performing a hash operation on a second block of input data generally in parallel with the ciphering operation so that the ciphering and hash operations are atomic.

22. The method of claim 3, wherein the first data block is equivalent to the second data block.

23. The method of claim 3, wherein the second data block is greater in size than the first data block.

* * * * *

UNITED STATES PATENT AND TRADEMARK OFFICE
CERTIFICATE OF CORRECTION

PATENT NO. : 6,778,667 B1
DATED : August 17, 2004
INVENTOR(S) : Bakhle et al.

It is certified that error appears in the above-identified patent and that said Letters Patent is hereby corrected as shown below:

<u>Column 9,</u>
Line 36, delete "indudes" and insert -- includes --.

Signed and Sealed this

Fourteenth Day of December, 2004

JON W. DUDAS
*Director of the United States Patent and Trademark Office*